US012670584B2

(12) United States Patent
Kawagishi et al.

(10) Patent No.: US 12,670,584 B2
(45) Date of Patent: Jun. 30, 2026

(54) MEDICAL IMAGE PROCESSING APPARATUS, MEDICAL IMAGE PROCESSING METHOD, AND STORAGE MEDIUM

(71) Applicant: Canon Kabushiki Kaisha, Tokyo (JP)

(72) Inventors: Masami Kawagishi, Kawasaki (JP); Kota Aoyagi, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 18/056,811

(22) Filed: Nov. 18, 2022

(65) Prior Publication Data

US 2023/0169653 A1 Jun. 1, 2023

(30) Foreign Application Priority Data

Nov. 30, 2021 (JP) ................................. 2021-194186

(51) Int. Cl.
*G06K 9/00* (2022.01)
*G06T 7/00* (2017.01)
(Continued)

(52) U.S. Cl.
CPC .............. *G06T 7/0012* (2013.01); *G06T 7/66* (2017.01); *G06V 10/764* (2022.01); *G06T 2207/30061* (2013.01)

(58) Field of Classification Search
CPC .............. G06V 10/764; G06V 10/774; G06V 10/7784; G06V 2201/03; G06V 20/52; G06V 2201/07; G06V 10/17; G06V 10/40; G06V 10/7715; G06V 40/10; A61B 6/035; A61B 6/0407; A61B 6/4435; A61B 6/04; A61B 6/0487; A61B 6/4405; A61B 6/4411; A61B 6/4476; G06F 18/214; G06F 18/2178; G06F 18/2413; G06F 18/251;
(Continued)

(56) References Cited

U.S. PATENT DOCUMENTS

| 2006/0159368 A1* | 7/2006 | Kondo | ...................... | G06T 1/00 |
| | | | | 382/299 |
| 2014/0348402 A1* | 11/2014 | Doi | ...................... | G06F 16/5838 |
| | | | | 382/128 |

(Continued)

FOREIGN PATENT DOCUMENTS

| JP | 2007-289335 A | 11/2007 |
| JP | 2020-58472 A | 4/2020 |
| WO | WO 2017/150947 A1 | 9/2017 |

OTHER PUBLICATIONS

Extended European Search Report issued Mar. 30, 2023 in European Patent Application No. 22210506.6, 6 pages.
(Continued)

*Primary Examiner* — Alex Kok S Liew
(74) *Attorney, Agent, or Firm* — Oblon, McClelland, Maier & Neustadt, L.L.P.

(57) ABSTRACT

A medical image processing apparatus includes processing circuitry. The processing circuitry acquires medical image data to be analyzed. The processing circuitry identifies the direction of gravity for the medical image data. The processing circuitry sets the first weight to pixels constituting the medical image data on the basis of the direction of gravity. The processing circuitry analyzes the medical image data on the basis of the first weight.

20 Claims, 10 Drawing Sheets

(51) Int. Cl.
*G06T 7/66* (2017.01)
*G06V 10/764* (2022.01)

(58) Field of Classification Search
CPC .... G06F 16/587; G06F 21/31; G06F 2111/16;
G06F 2113/12; G06F 2119/18; G06T
2207/10081; G06T 7/0012; G06T 11/005;
G06T 2207/10152; G06T 2207/30016
See application file for complete search history.

(56) References Cited

U.S. PATENT DOCUMENTS

| | | | |
|---|---|---|---|
| 2017/0160362 A1* | 6/2017 | Nauerth | A61B 5/055 |
| 2017/0325771 A1 | 11/2017 | Tsunomori et al. | |
| 2019/0365475 A1* | 12/2019 | Krishnaswamy | A61B 17/3403 |
| 2020/0093455 A1* | 3/2020 | Wang | G06V 10/764 |
| 2020/0293155 A1 | 9/2020 | Shin | |
| 2021/0012524 A1* | 1/2021 | Tomochika | G06V 20/20 |
| 2021/0125313 A1* | 4/2021 | Bai | G06V 10/806 |
| 2021/0241016 A1* | 8/2021 | Hashimoto | G01T 1/161 |

OTHER PUBLICATIONS

Office Action issued Aug. 27, 2025, in corresponding Japanese Patent Application No. 2021-194186 (with English translation), 10 pages.
Office Action issued Feb. 4, 2026, in corresponding Japanese Patent Application No. 2021-194186 (with English Translation), 6 pages.
Office Action issued Apr. 25, 2026, in corresponding Chinese Patent Application No. 202211483486.X, 15 pages.

* cited by examiner

DIRECTION
OF
GRAVITY

DIRECTION
OF
GRAVITY

DIRECTION
OF
GRAVITY

MEDICAL IMAGE PROCESSING APPARATUS, MEDICAL IMAGE PROCESSING METHOD, AND STORAGE MEDIUM

CROSS-REFERENCE TO RELATED APPLICATIONS

This application is based upon and claims the benefit of priority from Japanese Patent Application No. 2021-194186, filed on Nov. 30, 2021; the entire contents of which are incorporated herein by reference.

FIELD

Embodiments disclosed herein generally relate to a medical image processing apparatus, a medical image processing method, and a storage medium.

BACKGROUND

In the related art, there are known techniques for identifying medical image data that is highly likely to have an artifact, called a gravitational effect, occurring due to the influence of gravity when the medical image data is imaged. For example, such techniques involve specifying a location where the artifact is likely to occur due to a gravitational effect on the basis of clinical knowledge and identifying medical image data that is highly likely to have the artifact on the basis of the continuity of a high absorption region at that location.

DETAILED DESCRIPTION

Figure 1:
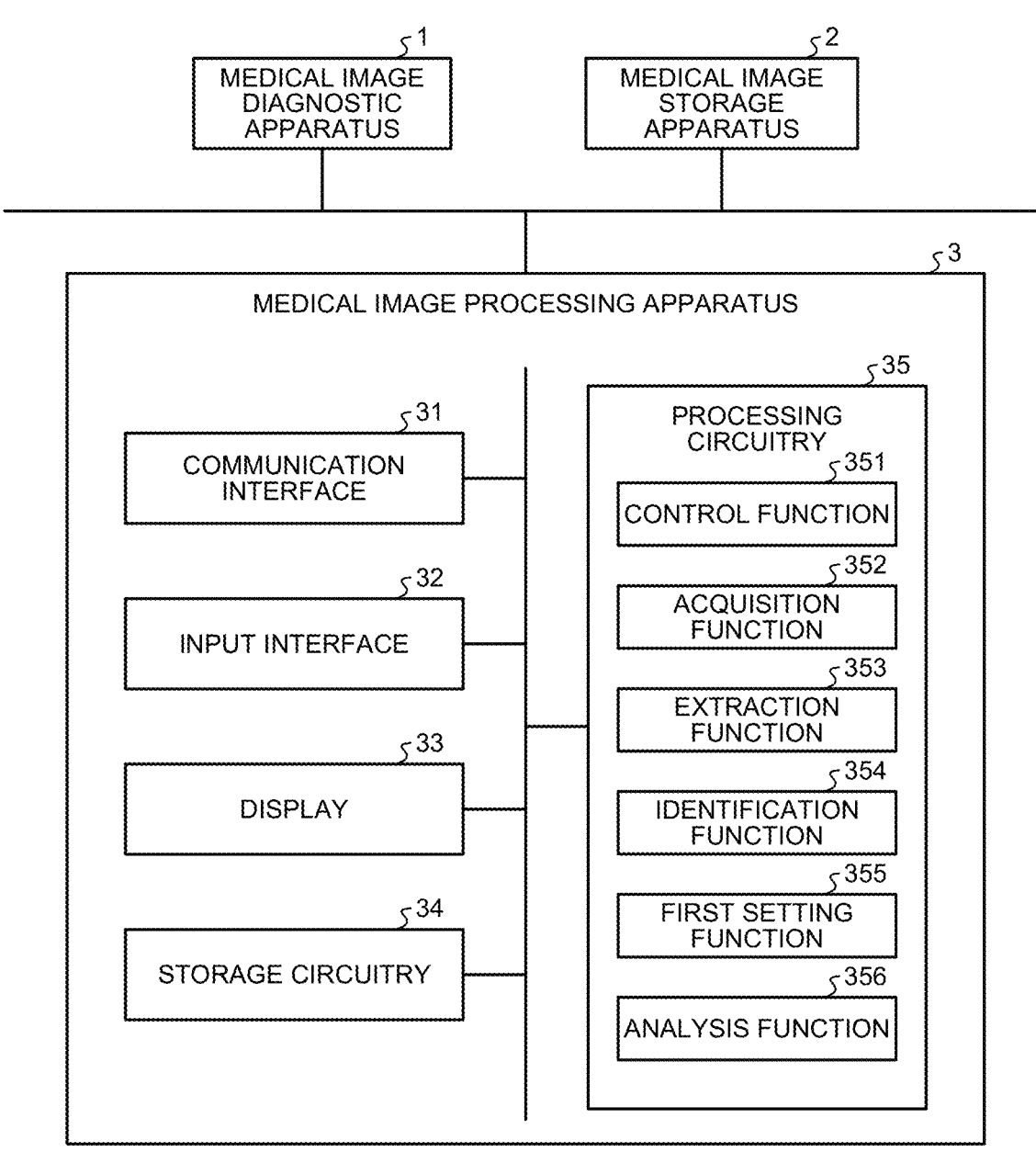
FIG. 1 is a diagram illustrating a configuration example of a medical image processing apparatus according to a first embodiment.

According to an embodiment, a medical image processing apparatus includes processing circuitry. The processing circuitry is configured to acquire medical image data to be analyzed. The processing circuitry is configured to identify the direction of gravity for the medical image data. The processing circuitry is configured to set the first weight to pixels constituting the medical image data on the basis of the direction of gravity. The processing circuitry is configured to analyze the medical image data on the basis of the first weight.

Hereinafter, embodiments of a medical image processing apparatus, a medical image processing method, and a storage medium are described in detail with reference to the drawings. The medical image processing apparatus, the medical image processing method, and the storage medium according to the present application are not limited by the following embodiments. In the following description, common reference numerals are assigned to similar components, and duplicate descriptions thereof are omitted.

First Embodiment

FIG. 1 is a diagram illustrating a configuration example of a medical image processing apparatus according to a first embodiment. For example, as illustrated in FIG. 1, a medical image processing apparatus 3 according to the present embodiment is communicably connected to a medical image diagnostic apparatus 1 and a medical image storage apparatus 2 via a network. Various other apparatuses and systems may be connected to the network illustrated in FIG. 1.

The medical image diagnostic apparatus 1 images an image of a subject and generates medical image data. Then, the medical image diagnostic apparatus 1 transmits the generated medical image data to various apparatuses on the network. For example, the medical image diagnostic apparatus 1 includes an X-ray diagnostic apparatus, an X-ray computed tomography (CT) apparatus, a magnetic resonance imaging (MRI) apparatus, an ultrasonic diagnostic apparatus, a single photon emission computed tomography (SPECT) apparatus, a positron emission computed tomography (PET) apparatus, and the like.

The medical image storage apparatus 2 stores various medical image data on the subject. Specifically, the medical image storage apparatus 2 receives the medical image data from the medical image diagnostic apparatus 1 via the network, and stores the medical image data in storage circuitry in the medical image storage apparatus 2. For example, the medical image storage apparatus 2 is implemented by computer equipment such as a server and a workstation. For example, the medical image storage apparatus 2 is implemented by a picture archiving and communication system (PACS) or the like, and stores medical image data in a format conforming to a digital imaging and communications in medicine (DICOM).

The medical image processing apparatus 3 performs various processes related to the medical image data. Specifically, the medical image processing apparatus 3 receives the medical image data from the medical image diagnostic apparatus 1 or the medical image storage apparatus 2 via the network, and performs various information processes by using the medical image data. For example, the medical image processing apparatus 3 is implemented by computer equipment such as a server and a workstation.

For example, the medical image processing apparatus 3 includes a communication interface 31, an input interface 32, a display 33, storage circuitry 34, and processing circuitry 35.

The communication interface 31 controls transmission and communication of various data transmitted/received between the medical image processing apparatus 3 and other apparatuses connected via the network. Specifically, the communication interface 31 is connected to the processing circuitry 35, and transmits data received from other apparatuses to the processing circuitry 35 or transmits data transmitted from the processing circuitry 35 to other apparatuses. For example, the communication interface 31 is implemented by a network card, a network adapter, a network interface controller (NIC), or the like.

The input interface 32 receives various instructions and input operations of various information from a user. Specifically, the input interface 32 is connected to the processing circuitry 35, converts an input operation received from the user into an electrical signal, and transmits the electrical signal to the processing circuitry 35. For example, the input interface 32 is implemented by a trackball, a switch button, a mouse, a keyboard, a touch pad for performing an input operation by touching an operation surface, a touch screen with integrated display screen and touch pad, a non-contact input interface using an optical sensor, a voice input interface, or the like. In this specification, the input interface 32 is not limited to only those with physical operation parts such as a mouse and a keyboard. For example, an example of the input interface 32 also includes electrical signal processing circuitry that receives an electrical signal corresponding to an input operation from an external input device provided separately from the apparatus and outputs the electrical signals to control circuitry.

The display 33 displays various information and various data. Specifically, the display 33 is connected to the processing circuitry 35 and displays various information and various data received from the processing circuitry 35. For example, the display 33 is implemented by a liquid crystal display, a cathode ray tube (CRT) display, a touch panel, or the like.

The storage circuitry 34 stores various data and various computer programs. Specifically, the storage circuitry 34 is connected to the processing circuitry 35, stores data received from the processing circuitry 35 or reads stored data, and transmits the read data to the processing circuitry 35. For example, the storage circuitry 34 is implemented by a semiconductor memory element such as a random access memory (RAM) and a flash memory, a hard disk, an optical disk, or the like.

The processing circuitry 35 controls the entire medical image processing apparatus 3. For example, the processing circuitry 35 performs various processes in response to input operations received from a user via the input interface 32. For example, the processing circuitry 35 receives data transmitted from other devices via the communication interface 31 and stores the received data in the storage circuitry 34. For example, the processing circuitry 35 transmits data received from the storage circuitry 34 to the communication interface 31, thereby transmitting the data to other devices. For example, the processing circuitry 35 displays data received from the storage circuitry 34 on the display 33.

So far, the configuration example of the medical image processing apparatus 3 according to the present embodiment has been described. For example, the medical image processing apparatus 3 according to the present embodiment is installed in medical facilities such as hospitals and clinics and assists a user such as a doctor in making various diagnoses and treatment plans. For example, in analyzing medical image data, the medical image processing apparatus 3 performs various processes for appropriately performing the analysis even when the artifact and an abnormal shadow similar to the artifact appear in the medical image data at the same time.

As described above, there are known techniques for identifying medical image data that is highly likely to have the artifact on the basis of clinical knowledge with respect to the artifact occurring in the medical image data due to the influence of gravity. However, since it is difficult to completely distinguish such the artifact from an abnormal shadow similar to the artifact (for example, ground glass opacity (GGO) or the like), even though the above technique is used, the artifact and the abnormal shadow are all treated as abnormal shadows when they appear at the same time.

Therefore, the medical image processing apparatus 3 according to the present embodiment is configured to be able to set a weight to pixels constituting medical image data on the basis of the direction of gravity in the medical image data, and to perform analysis based on the set weight, thereby appropriately performing analysis even when the artifact and an abnormal shadow similar to the artifact appear in the medical image data at the same time. Hereinafter, the medical image processing apparatus 3 having such a configuration is described in detail.

For example, as illustrated in FIG. 1, in the present embodiment, the processing circuitry 35 of the medical image processing apparatus 3 performs a control function 351, an acquisition function 352, an extraction function 353, an identification function 354, a first setting function 355, and an analysis function 356. The acquisition function 352 is an example of an acquisition unit. The extraction function 353 is an example of an extraction unit. The identification function 354 is an example of an identification unit. The first setting function 355 is an example of a first setting unit. The analysis function 356 is an example of an analysis unit.

The control function 351 generates various graphical user interfaces (GUIs) and various display information in response to operations via the input interface 32, and controls the generated GUIs and display information to be displayed on the display 33. For example, the control function 351 allows the display 33 to display a GUI for performing image processing on medical image data, an analysis result of analysis on the medical image data, and the like. The control function 351 generates various display images based on medical image data acquired by the acquisition function 352, and allows the display 33 to display the generated display images.

The acquisition function 352 acquires the medical image data to be analyzed from the medical image diagnostic apparatus 1 or the medical image storage apparatus 2 via the communication interface 31. Specifically, the acquisition function 352 acquires two-dimensional medical image data or three-dimensional medical image data (volume data) that is subject to image analysis related to various diagnoses. The acquisition function 352 can also acquire a plurality of volume data obtained by taking a plurality of three-dimensional images in the time direction. For example, the acquisition function 352 acquires CT image data, ultrasound image data, MRI image data, X-ray image data, Angio image data, PET image data, SPECT image data, and the like as the medical image data described above. The processing circuitry 35 receives the medical image data of the subject from the medical image diagnostic apparatus 1 or the medical image storage apparatus 2 by performing the acquisition function 352 described above, and stores the received medical image data in the storage circuitry 34.

The extraction function 353 extracts at least one structure of the subject from the medical image data. Specifically, the extraction function 353 extracts a region indicating a biological organ included in the medical image data acquired by the acquisition function 352. For example, the extraction function 353 extracts regions corresponding to lungs and the like included in the medical image data. The processing by the extraction function 353 is described in detail below.

The identification function 354 identifies the direction of gravity for the medical image data acquired by the acquisition function 352. The processing by the identification function 354 is described in detail below.

The first setting function 355 sets a first weight to pixels constituting the medical image data on the basis of the direction of gravity. The processing by the first setting function 355 is described in detail below.

The analysis function 356 analyzes the medical image data on the basis of the first weight. The processing by the analysis function 356 is described in detail below.

The processing circuitry 35 described above is implemented by, for example, a processor. In such a case, the processing functions described above are stored in the storage circuitry 34 in the form of computer programs executable by a computer. The processing circuitry 35 reads the computer programs stored in the storage circuitry 34 and executes the read computer programs, thereby implementing functions corresponding to the executed computer programs. In other words, the processing circuitry 35 in the state of reading the computer programs has the processing functions illustrated in FIG. 1.

The processing circuitry 35 may be configured by combining a plurality of independent processors, and respective processors may implement respective processing functions by executing respective computer programs. Furthermore, the respective processing functions of the processing circuitry 35 may be implemented by being appropriately distributed or integrated into single processing circuitry or a plurality of pieces of processing circuitry. Furthermore, the respective processing functions of the processing circuitry 35 may be implemented by a combination of hardware such as circuitries and software. In the above, an example in which the computer programs corresponding to the respective processing functions are stored in the single storage circuitry 34 has been described; however, the embodiment is not limited thereto. For example, the computer programs corresponding to the respective processing functions may be distributed and stored in a plurality of pieces of storage circuitry, and the processing circuitry 35 may be configured to read each computer program from each storage circuitry and execute the read computer program.

Figure 2:
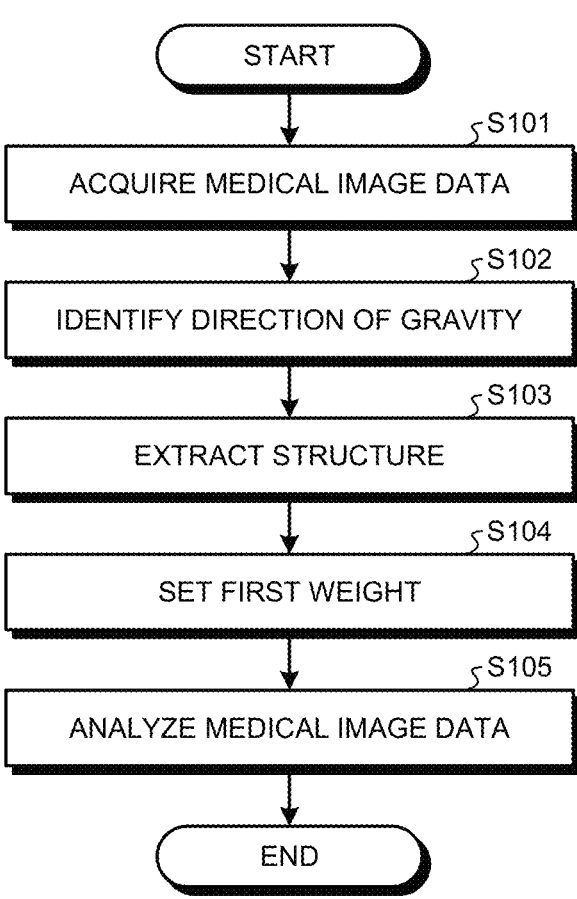
FIG. 2 is a flowchart illustrating the procedure of processing performed by each processing function of processing circuitry of the medical image processing apparatus according to the first embodiment.

Next, the procedure of processing by the medical image processing apparatus 3 is described with reference to FIG. 2, and then details of each processing are described. FIG. 2 is a flowchart illustrating the procedure of processing performed by each processing function of the processing circuitry 35 of the medical image processing apparatus 3 according to the first embodiment.

For example, as illustrated in FIG. 2, in the present embodiment, the acquisition function 352 acquires the medical image data of the subject from the medical image diagnostic apparatus 1 or the medical image storage apparatus 2 (step S101). For example, the acquisition function 352 acquires designated medical image data in response to an operation to acquire the medical image data via the input interface 32. This process is implemented by, for example, the processing circuitry 35 that calls a computer program corresponding to the acquisition function 352 from the storage circuitry 34 and executes the called computer program.

Subsequently, the identification function 354 identifies the direction of gravity in the acquired medical image data (Step S102). For example, this process is implemented by the processing circuitry 35 that calls a computer program corresponding to the identification function 354 from the storage circuitry 34 and executes the called computer program.

Subsequently, the extraction function 353 extracts a structure included in the medical image data with respect to the acquired medical image data (step S103). This process is implemented by, for example, the processing circuitry 35 that calls a computer program corresponding to the extraction function 353 from the storage circuitry 34 and executes the called computer program. Although FIG. 2 illustrates an example in which the structure is extracted after the direction of gravity is identified, the embodiment is not limited thereto, and the direction of gravity may be identified after the structure is extracted or the identification of the direction of gravity and the extraction of the structure may be performed at the same time.

Subsequently, the first setting function 355 sets the first weight to pixels of the medical image data on the basis of the direction of gravity (step S104). This process is implemented by, for example, the processing circuitry 35 that calls a computer program corresponding to the first setting function 355 from the storage circuitry 34 and executes the called computer program.

Subsequently, the analysis function 356 analyzes the medical image data by using the first weight (step S105). This process is implemented by, for example, the processing circuitry 35 that calls a computer program corresponding to the analysis function 356 from the storage circuitry 34 and executes the called computer program.

Although not illustrated in FIG. 2, after analyzing the medical image data, the control function 351 can allow the display 33 to display the analysis result. This process is implemented by, for example, the processing circuitry 35 that calls a computer program corresponding to the control function 351 from the storage circuitry 34 and executes the called computer program.

Hereinafter, details of each process performed by the medical image processing apparatus 3 are described below. In the following, an example of processing when three-dimensional chest X-ray CT image data is acquired as medical image data and analysis on lungs is performed is described. A processing target described in the present embodiment is not limited thereto, and various other biological organs can be targets.

Medical Image Data Acquisition Process

As described at step S101 in FIG. 2, the acquisition function 352 acquires three-dimensional X-ray CT image data obtained by imaging the chest in response to the operation to acquire the medical image data via the input interface 32.

The acquisition process of the medical image data at step S101 may be started by an instruction from a user via the input interface 32 as described above, but may also be started automatically. In such a case, for example, the acquisition function 352 monitors the medical image storage apparatus 2 and automatically acquires new three-dimensional chest X-ray CT image data each time it is stored.

As described above, after the three-dimensional chest X-ray CT image data is acquired by the acquisition function 352, the acquired image data may be displayed on the display 33.

Gravity Direction Identification Process

As described at step S102 in FIG. 2, the identification function 354 identifies the direction of gravity in the three-dimensional chest X-ray CT image data acquired by the acquisition function 352. Specifically, the identification function 354 identifies the direction of gravity applied to the subject when the three-dimensional chest X-ray CT image data was imaged (that is, the direction of gravity toward the subject depicted in the three-dimensional chest X-ray CT image data).

For example, the identification function 354 identifies the direction of gravity on the basis of the posture of the subject imaged in the three-dimensional chest X-ray CT image data. In an example, the identification function 354 estimates the posture of the subject from the imaging information of the three-dimensional chest X-ray CT image data and identifies the direction of gravity on the basis of the estimated posture. The identification function 354 acquires imaging information from a patient position, which is one of header information of a digital imaging and communications in medicine (DICOM) that is a standard for medical image data. For example, when the imaging information is head first-supine (HFS) or feet first-supine (FFS), the identification function 354 estimates that the subject was imaged in the supine position. Furthermore, when the imaging information is head first-prone (HFP), the identification function 354 estimates that the subject was imaged in the prone position, and when the imaging information is head first-decubitus left (HDFL), the identification function 354 estimates that the subject was imaged in the left lateral decubitus position.

The identification function 354 identifies that the direction of gravity is the dorsal direction when the posture is supine, identifies that the direction of gravity is the ventral direction when the posture is prone, and identifies that the direction of gravity is the left direction of the body axis when the posture is left lateral decubitus. In the following, it is assumed that the three-dimensional chest X-ray CT image data is imaged in the supine position and the direction of gravity is the dorsal direction.

Structure Extraction Process

As described at step S103 in FIG. 2, the extraction function 353 extracts a structure included in the three-dimensional chest X-ray CT image data. Specifically, the extraction function 353 acquires coordinate information of pixels indicating lungs and the like in the three-dimensional chest X-ray CT image data. The extraction function 353 can extract the structure by using various methods. For example, the extraction function 353 can extract, as the lungs, regions designated on the three-dimensional chest X-ray CT image data via the input interface 32. That is, the extraction function 353 extracts, as the lungs, regions manually designated by a user.

For example, the extraction function 353 can extract the lungs on the basis of an anatomical structure depicted in the three-dimensional chest X-ray CT image data by a known region extraction technique. For example, the extraction function 353 extracts the lungs in the three-dimensional chest X-ray CT image data by using an Otsu's binarization method based on CT values, a region growing method, a snakes method, a graph cut method, a mean shift method, and the like.

In addition, the extraction functions 353 can extract the lungs in the three-dimensional chest X-ray CT image data by using a learned model constructed on the basis of learning data prepared in advance using a machine learning technique (including deep learning). By extracting the lungs by any of the above methods, the extraction function 353 can also extract the chest wall outside the lungs (non-mediastinum side) by anatomical knowledge.

First Weight Setting Process

As described at step S104 in FIG. 2, the first setting function 355 sets the first weight to the pixels of the three-dimensional chest X-ray CT image data. Specifically, the first setting function 355 sets the first weight on the basis of the direction of gravity and at least one structure. For example, the first setting function 355 sets the first weight on the basis of the direction of gravity and the distance from an edge of the extracted structure.

The gravitational effect described above occurs when a soft tissue (for example, lung), which is susceptible to gravity, is supported by a hard tissue (for example, chest wall), which is less susceptible to gravity, and is compressed. The compression of the soft tissue is highly likely to occur in a portion closer to where a load is applied, that is, the hard tissue.

Therefore, the first setting function 355 assumes that the chest wall exists outside the extracted lungs, and determines an edge that is in the direction indicated by a gravity vector among edges substantially perpendicular to the direction of gravity in edge portions of the extracted lungs. Then, the first setting function 355 sets the first weight according to the distance from the determined edge.

Figure 3:
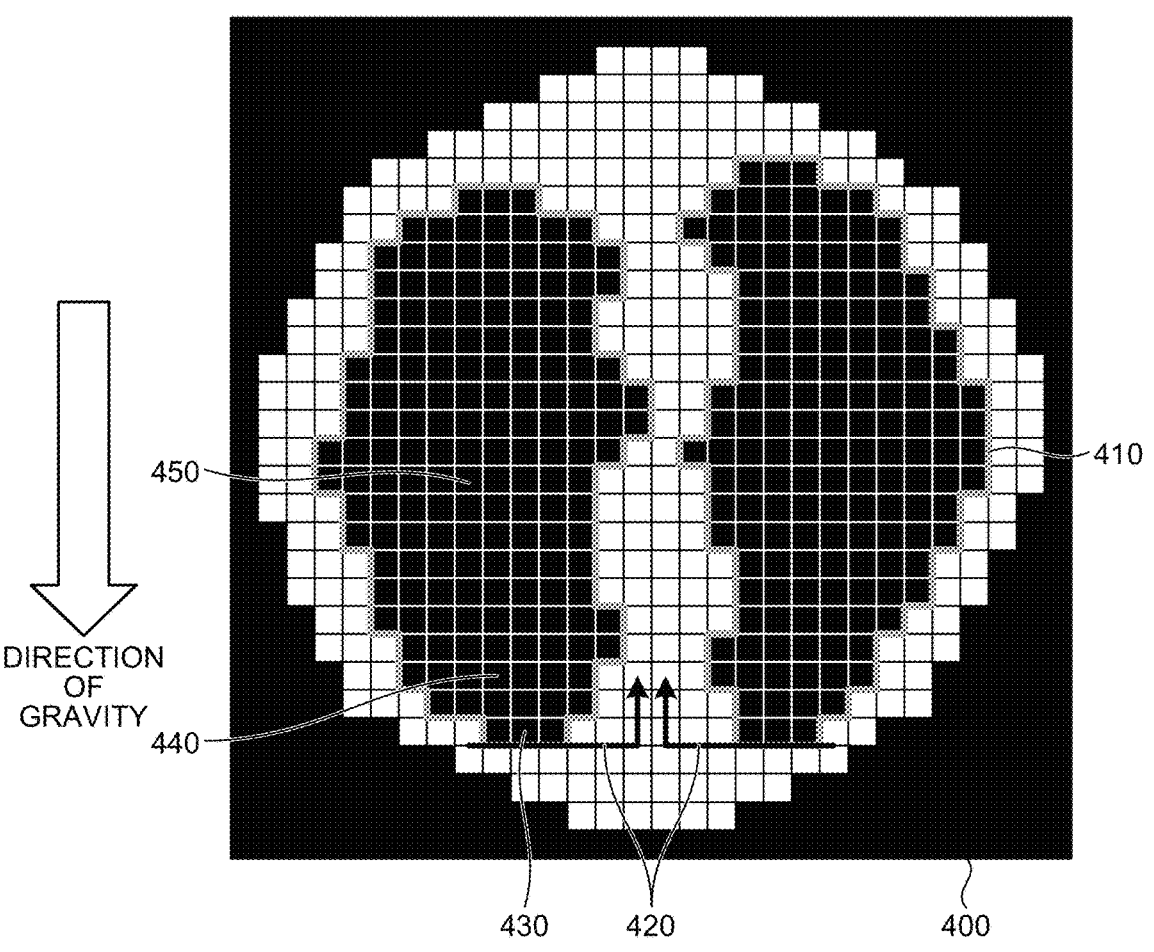
FIG. 3 is a diagram for explaining an example of a first weight setting process according to the first embodiment.

FIG. 3 is a diagram for explaining an example of the first weight setting process according to the first embodiment. FIG. 3 illustrates one cross-sectional image data 400 of a body axial cross-section (axial cross-section) in the three-dimensional chest X-ray CT image data. For example, the cross-sectional image data 400 is selected by a user as image data to be analyzed. The identification function 354 identifies the direction of gravity illustrated in FIG. 3 on the basis of the imaging information of the three-dimensional chest X-ray CT image data. The extraction function 353 extracts the lungs included in the three-dimensional chest X-ray CT image data, and extracts lung edges 410 on the basis of the extracted lungs.

For example, the first setting function 355 determines edges 420 that are in the direction indicated by arrows in the direction of gravity among edges substantially orthogonal to the gravity direction in the extracted lung edges 410 (hereinafter, the edges 420 are referred to as reference edges 420). Then, the first setting function 355 sets the first weight to pixels according to the distance from the determined reference edge 420. For example, the first setting function 355 sets the first weight to each pixel on the basis of the following equation (1).

$$w_1(i)=0.5+0.1\times\min(l_1(i),5) \qquad (1)$$

In equation (1) above, "$w_1(i)$" indicates the first weight of a pixel i. "$l_i(i)$" indicates the distance in the direction of gravity (number of pixels) from the reference edge to the pixel. "$\min(l_i(i), 5)$" indicates a function that takes a smaller value between "$l_1(i)$" and "5".

For example, the first setting function 355 sets the first weight "$w_1=0.5+0.1\times0=0.5$" by inputting "$l_1=0$" into equation (1) above for a pixel 430 in contact with the reference edge 420. The first setting function 355 sets the first weight "$w_1=0.5+0.1\times2=0.7$" by inputting "$l_1=2$" into equation (1) above for a pixel 440 apart from the reference edge 420 by "2" pixels in the direction of gravity. The first setting function 355 sets the first weight "$w_1=0.5+0.1\times5=1.0$" to a pixel 450 apart from the reference edge 420 by more than "5" pixels in the direction of gravity.

That is, in equation (1) above, when the distance in the direction of gravity from the reference edge is less than a threshold value (5 pixels in this example), the shorter the distance in the direction of gravity from the reference edge, the smaller the first weight. This is an equation that takes the production mechanism of the above-described gravitational effect into consideration. Of course, the setting method using this equation is merely an example, and the first weight may be set by other methods.

In FIG. 3, the reference edges are at the same position in the left and right lungs, but the reference edges may be at different positions in the left and right lungs. Alternatively, the first weight may be set using different equations for the right lung and the left lung.

In the example illustrated in FIG. 3, an example in a two-dimensional space is illustrated for simplicity of explanation, but the reference edge (point/tangent surface) may be set in a three-dimensional space and the first weight may be set. In such a case, the first setting function 355 determines the reference edge in three-dimensional space on the basis of the lung edge extracted in the volume data and the direction of gravity, and sets the first weight to each voxel according to the distance from the reference edge.

In the example illustrated in FIG. 3, a case where the distance from the reference edge is calculated by the number of pixels has been described; however, the embodiment is not limited thereto and the distance in real space may be calculated. In such a case, for example, as in Equation (1) above, a threshold value is set for the distance in real space in the direction of gravity from the reference edge, and the first weight is set so that at distances less than the set threshold value, the shorter the distance in the direction of gravity from the reference edge, the smaller the first weight.

In Equation (1) above, an example in which the threshold value is constant (5 pixels) has been described; however, the embodiment is not limited thereto and the threshold value may be changed dynamically. In an example, the threshold value may be determined dynamically according to the body size of the subject (for example, the larger the body, the larger the threshold value).

Analysis Process

As described at step S105 in FIG. 2, the analysis function 356 performs the analysis process on the three-dimensional chest X-ray CT image data by using the first weight set to each pixel by the first setting function 355. For example, the analysis function 356 can analyze the distribution (mean, variance, and the like) of CT values within the lungs. In such a case, the analysis function 356 multiplies the CT value of each pixel by the first weight, and calculates a weighted mean or a weighted variance by using the sum of CT values multiplied by the first weight. The analysis function 356 can also analyze the entire cross-sectional image data 400 illustrated in FIG. 3, or can also analyze a local region in the cross-sectional image data 400.

Then, the analysis function 356 analyzes the three-dimensional chest X-ray CT image data by inputting the calculated weighted mean or weighted variance into a classifier that infers disease names or as input feature amounts for similar case search. The analysis example described above is merely an example, and the analysis function 356 can also perform weighted analysis using other types of image processing.

First Variation

In the embodiment described above, at step S102, the imaging information of the three-dimensional chest X-ray CT image data is acquired from the header information of the DICOM, the posture of the subject at the time of imaging is estimated, and the direction of gravity is identified on the basis of the estimated posture. However, the embodiment is not limited thereto and other methods may be used to estimate the posture and identify the direction of gravity. For example, the identification function 354 may estimate the posture of the subject at the time of imaging from radiology information systems (RIS), electronic medical charts, and the like, and identify the direction of gravity on the basis of the estimated posture.

The identification function 354 may also identify the direction of gravity by image analysis on medical image data. For example, the identification function 354 estimates the posture of the subject from the result of image analysis on the medical image data, and identifies the direction of gravity on the basis of the estimated posture. In an example, the identification function 354 measures the diameter of an opening of the spine and the posterior mediastinum, the contact area between the mediastinum and the chest wall, and the like in the three-dimensional chest X-ray CT image data through image processing, and estimates the posture of the subject at the time of imaging the three-dimensional chest X-ray CT image data, on the basis of the measured diameter, contact area, and the like. Then, the identification function 354 identifies the direction of gravity on the basis of the estimated posture.

Second Variation

In the embodiment described above, a case where the first weight is set at step S104 on the basis of the direction of gravity and the extracted structure has been described. However, the embodiment is not limited thereto, and the first weight may be set by other methods. For example, the first setting function 355 calculates an angle at which a portion corresponding to a pixel is supported by a structure extracted from medical image data, on the basis of the direction of gravity and the structure, and sets the first weight to the pixel on the basis of the calculated angle and the distance to the structure.

Figure 4:
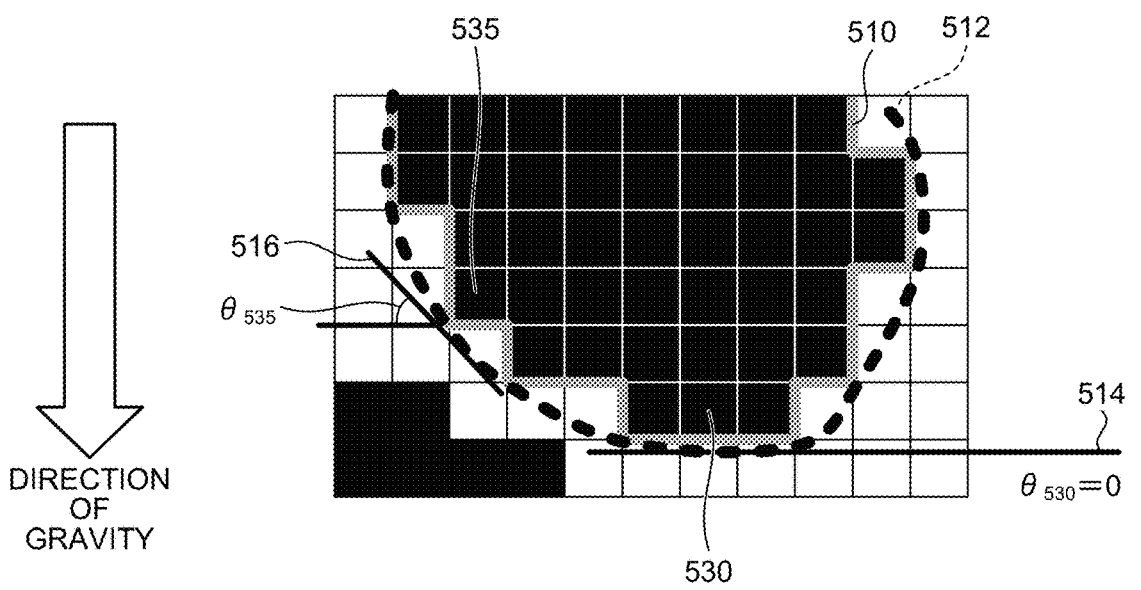
FIG. 4 is a diagram for explaining an example of a first weight setting process according to a second variation.

FIG. 4 is a diagram for explaining an example of a first weight setting process according to a second variation. FIG. 4 illustrates an enlarged view of one cross-sectional image data of an axial cross-section in the three-dimensional chest X-ray CT image data. The identification function 354 identifies the direction of gravity illustrated in FIG. 4. The extraction function 353 extracts lungs included in the three-dimensional chest X-ray CT image data, and extracts lung edges 510 on the basis of the extracted lungs.

For example, the first setting function 355 extracts an approximate edge 512 obtained by curve-fitting the lung edges 510. Then, the first setting function 355 specifies a pixel j an edge of which is in contact with the approximate edge 512, and calculates an angle "$\theta_j$" between a tangent line at the specified pixel j and the direction of gravity. In such a case, it is assumed that "$0 \leq \theta j \leq \pi/2$".

For example, the first setting function 355 calculates an angle between a tangent line 514 to the approximate edge 512 and the direction of gravity as "$\theta_{530}=0$" at a pixel 530 illustrated in FIG. 4. The first setting function 355 calculates an angle between a tangent line 516 to the approximate edge 512 and the direction of gravity as "$\theta_{535}=0$" at a pixel 535.

Then, the first setting function 355 sets, as the first weight "$w_1(i)$", a minimum value calculated from the Euclidean distance "$l_{ij}(i)$" from a pixel i to which the first weight is set to each pixel j an edge of which is in contact with the approximate edge 512 and "$\theta_j$". For example, the first setting function 355 sets the first weight to each pixel on the basis of equation (2) below.

$$w_1(i) = 0.5 + 0.1 \times \min\left(\min_j(|\sin\theta_j| + l_{1j}(i)), 5\right) \qquad (2)$$

In equation (2) above, "$\min_j(.)$" indicates a value for the pixel j whose expression in parentheses is the smallest among the pixels j in contact with the edges. In Equation (2) above, $|\sin\theta_j|$ is added to the Euclidean distance "$l_{ij}(i)$", and $|\sin\theta_j|>0$ if $\theta_j>0$. Therefore, except for pixels having a tangent line perpendicular to the direction of gravity, a positive value is assigned to the distance and the value increases, so that the first weight "$w_1(i)$" increases. As described above, the smaller the first weight, the more the influence of the gravitational effect is taken into consideration. That is, Equation (2) above is an equation considering that the first weight increases because gravity is dispersed in a place not perpendicular to the direction of gravity.

The first weight is not limited thereto, and various other weights may be set. For example, the first setting function 355 may uniformly set a weight smaller than "1" for pixels whose distance from the structure is less than a threshold value.

Third Variation

In the embodiment described above, a case where image processing is performed as the analysis process at step S105 has been described. However, the embodiment is not limited thereto, and for example, analysis by a learner may be performed. In such a case, for example, the analysis function 356 generates weighted image data based on the first weight and analyzes medical image data on the basis of the weighted image data.

Figure 5:
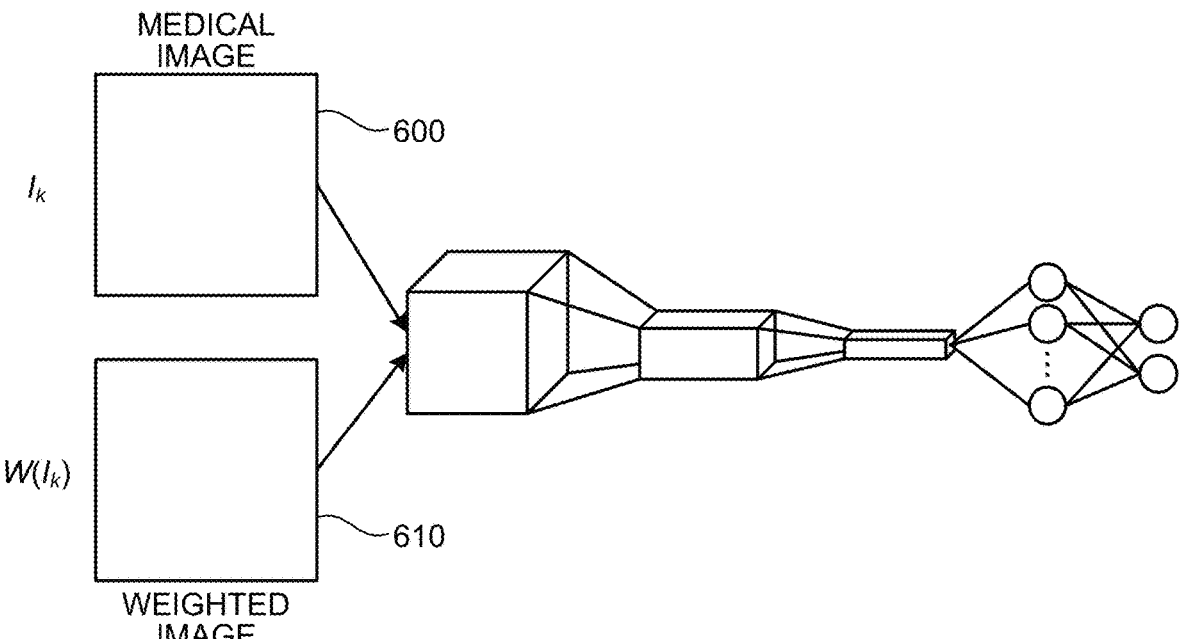
FIG. 5 is a diagram for explaining an example of an analysis process according to a third variation.

FIG. 5 is a diagram for explaining an example of an analysis process according to the third variation. For example, as illustrated in FIG. 5, the analysis function 356 generates weighted image data "$W(I_k)$" 610 with the first weight as a pixel value on the basis of the first weight set to each pixel of medical image data "$I_k$" 600. Then, the analysis function 356 inputs the medical image data "$I_k$" 600 and the weighted image data "$W(I_k)$" 610 to a learner using deep learning, and allows a final analysis result to be output through a plurality of convolution layers. The learner illustrated in FIG. 5 is, for example, a learner that receives the medical image data "$I_k$" 600 and the weighted image data "$W(I_k)$" 610 as inputs and outputs the presence or absence of disease. The learner illustrated in FIG. 5 is generated in advance and stored in the storage circuitry 34.

As described above, according to the first embodiment, the acquisition function 352 acquires medical image data to be analyzed. The identification function 354 identifies the direction of gravity for the medical image data. The first setting function 355 sets the first weight to pixels constituting the medical image data on the basis of the direction of gravity. The analysis function 356 analyzes the medical image data on the basis of the first weight. Consequently, the medical image processing apparatus 3 according to the first embodiment can perform analysis in consideration of the occurrence of the gravitational effect, making it possible to appropriately analyze the medical image data.

According to the first embodiment, the extraction function 353 extracts at least one structure of the subject from the medical image data. The first setting function 355 sets the first weight on the basis of the direction of gravity and the at least one structure. Consequently, the medical image processing apparatus 3 according to the first embodiment can set the first weight to a portion of the medical image data where the gravitational effect is highly likely to occur, making it possible to more appropriately analyze the medical image data.

According to the first embodiment, the identification function 354 estimates the posture of the subject from the imaging information of the medical image data, and identifies the direction of gravity on the basis of the estimated posture. Consequently, the medical image processing apparatus 3 according to the first embodiment makes it possible to easily identify the direction of gravity in the medical image data.

According to the first embodiment, the identification function 354 estimates the posture of the subject from the result of image analysis on the medical image data, and identifies the direction of gravity on the basis of the estimated posture. Consequently, the medical image processing apparatus 3 according to the first embodiment makes it possible to identify the direction of gravity from an image.

According to the first embodiment, the first setting function 355 sets the first weight to pixels on the basis of the direction of gravity and the distance from the edge of the structure extracted from the medical image data. Consequently, the medical image processing apparatus 3 according to the first embodiment makes it possible to set the first weight according to the ease with which a load is applied.

According to the first embodiment, the first setting function 355 calculates an angle at which a portion corresponding to a pixel is supported by the structure extracted from the medical image data, on the basis of the direction of gravity and the structure, and sets the first weight to the pixel on the basis of the calculated angle and the distance to the structure. Consequently, the medical image processing apparatus 3 according to the first embodiment makes it possible to set the first weight that better reflects the ease with which a load is applied.

According to the first embodiment, the analysis function 356 generates weighted image data based on the first weight, and analyzes the medical image data on the basis of the weighted image data. Consequently, the medical image processing apparatus 3 according to the first embodiment enables easy analysis.

Second Embodiment

In the first embodiment described above, a case where the first weight is set to the entire medical image data has been described. The second embodiment describes a case where it is determined whether shadows that suggest a gravitational effect exist in medical image data and the first weight is set only to pixels in regions corresponding to the shadows that suggest the gravitational effect when it is determined that the shadows exist. In other words, it is determined whether the gravitational effect may occur in at least one pixel of the medical image data, and when it is determined that the gravitational effect may occur, the first weight is set to a location (at least one pixel) where the gravitational effect may occur. In the following, as in the first embodiment, it is assumed that the three-dimensional chest X-ray CT image data is used as image data to be analyzed and lungs are extracted as a structure. Of course, targets are not limited thereto, and all are merely examples for explaining the process of the medical image processing apparatus.

Figure 6:
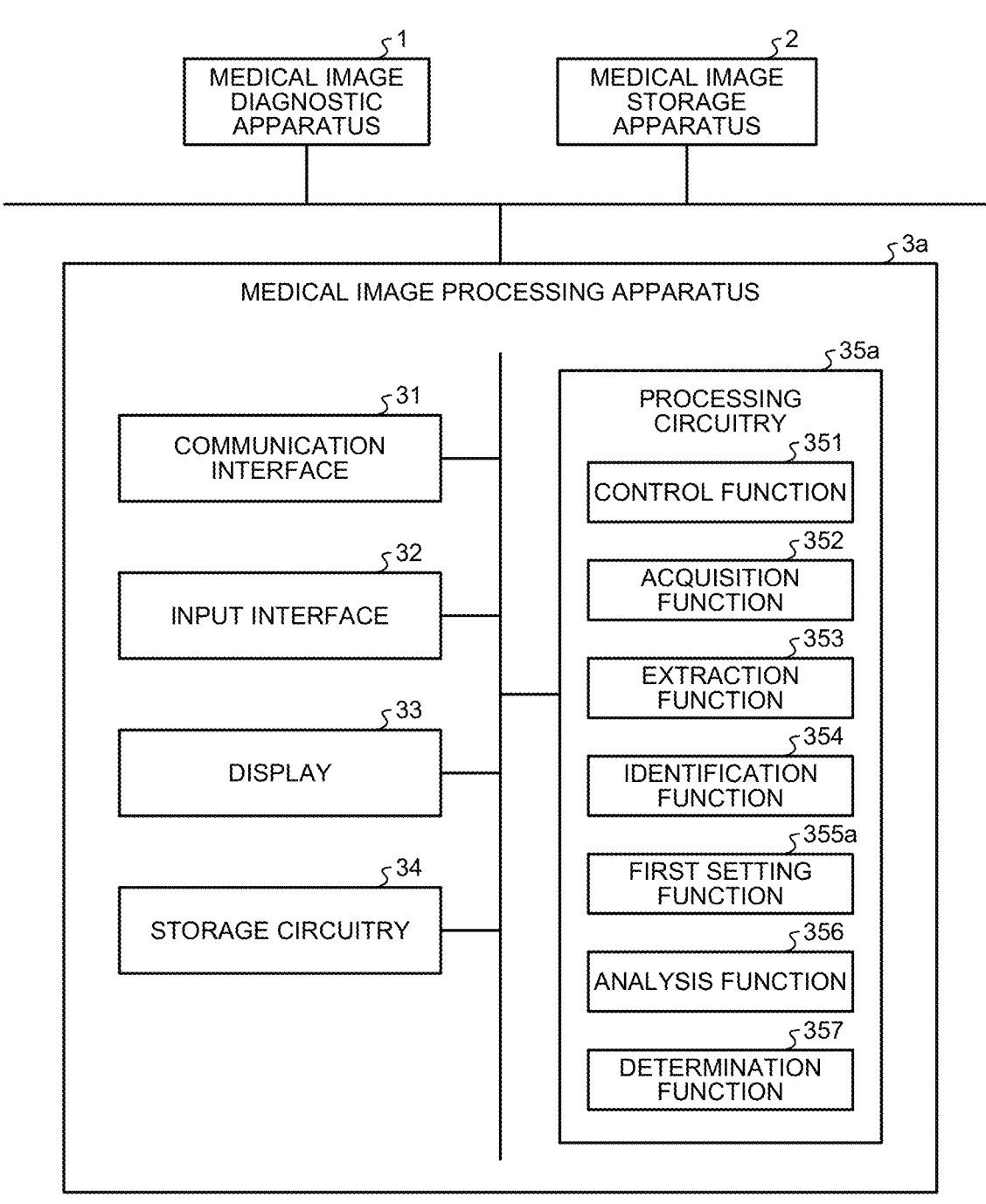
FIG. 6 is a diagram illustrating a configuration example of a medical image processing apparatus according to a second embodiment.

FIG. 6 is a diagram illustrating a configuration example of a medical image processing apparatus according to the second embodiment. In FIG. 6, the same reference numerals are assigned to components that operate in the same manner as the medical image processing apparatus 3 according to the first embodiment illustrated in FIG. 1. That is, a medical image processing apparatus 3a according to the second embodiment is different from the medical image processing apparatus 3 according to the first embodiment in that a processing circuitry 35a newly performs a determination function 357 and that the processing content of a first setting function 355a performed by the processing circuitry 35a is different from that in the first embodiment. These are mainly described below.

Figure 7:
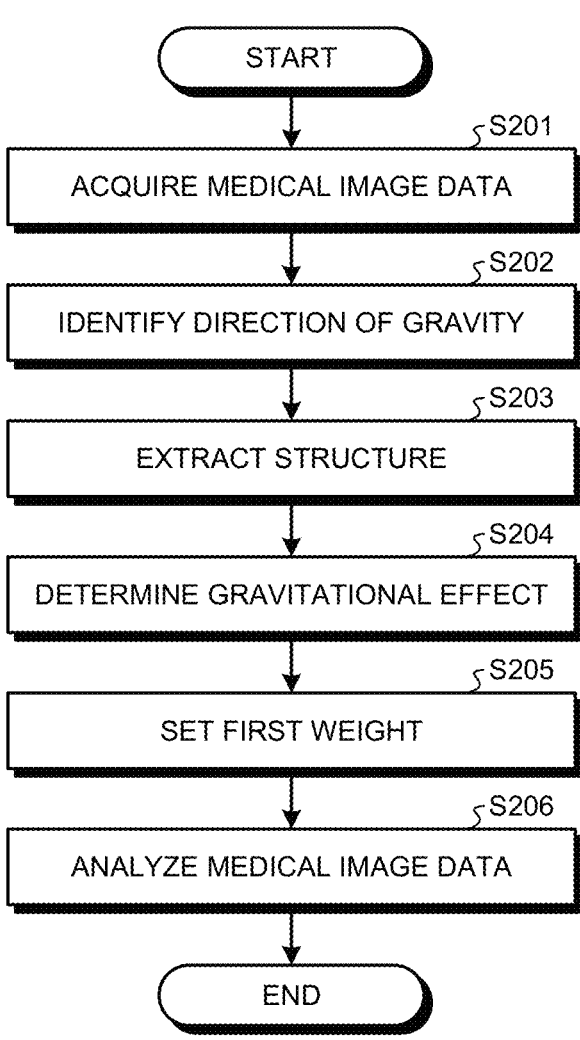
FIG. 7 is a flowchart illustrating the procedure of processing performed by each processing function of processing circuitry of the medical image processing apparatus according to the second embodiment.

FIG. 7 is a flowchart illustrating the procedure of processing performed by each processing function of the processing circuitry 35a of the medical image processing apparatus 3a according to the second embodiment.

Steps S201 to S203 in FIG. 7 are implemented by the processing circuitry 35a that reads a computer program corresponding to each processing function from the storage circuitry 34 and executes the read computer program, as in steps S101 to S103 in FIG. 2.

For example, as illustrated in FIG. 7, in the present embodiment, when the extraction function 353 extracts a structure (step S203), the determination function 357 determines whether a gravitational effect is occurring in medical image data (step S204). This process is implemented by, for example, the processing circuitry 35a that calls a computer program corresponding to the determination function 357 from the storage circuitry 34 and executes the read computer program.

Subsequently, the first setting function 355a sets the first weight to a pixel determined to have the gravitational effect (step S205). This process is implemented by, for example, the processing circuitry 35a that calls a computer program corresponding to the first setting function 355a from the storage circuitry 34 and executes the read computer program.

Step S206 in FIG. 7 is implemented by the processing circuitry 35a that calls a computer program corresponding to the analysis function 356 from the storage circuitry 34 and executes the read computer program, as in step S105 in FIG. 2.

Details of each process performed by the medical image processing apparatus 3a are described below.

Gravitational Effect Determination Process

As described at step S204 in FIG. 7, the determination function 357 determines whether the gravitational effect is occurring in the three-dimensional chest X-ray CT image data acquired by the acquisition function 352. Specifically, the determination function 357 determines whether the gravitational effect may occur in at least one pixel of the three-dimensional chest X-ray CT image data.

For example, the determination function 357 determines whether there are shadows that suggest the gravitational effect, on the basis of the three-dimensional chest X-ray CT image data, the direction of gravity identified from the posture of the subject, and the structure of the subject. In the present embodiment, an edge that is in the direction indicated by a gravity vector is determined using the method described in the first embodiment, and whether there are shadows that suggest the gravitational effect is determined on the basis of CT values of pixels at a certain distance from the determined edge. That is, on the basis of the result of image analysis on the medical image data, the determination function 357 determines whether the gravitational effect may occur in at least one pixel of the three-dimensional chest X-ray CT image data.

Figure 8:
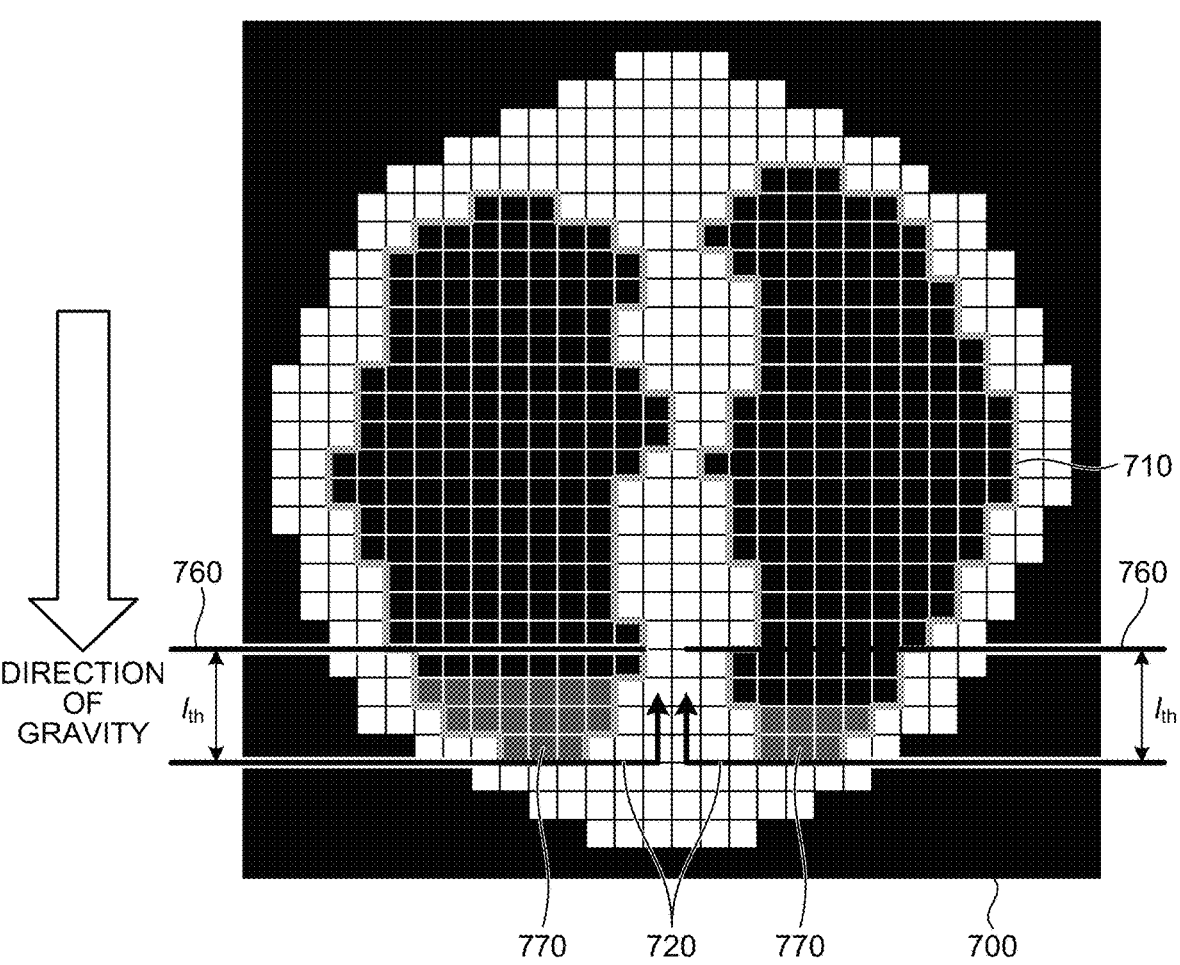
FIG. 8 is a diagram for explaining an example of a determination process according to the second embodiment.

FIG. 8 is a diagram for explaining an example of the determination process according to the second embodiment. FIG. 8 illustrates one cross-sectional image data 700 of an axial cross-section in the three-dimensional chest X-ray CT image data. The identification function 354 identifies the direction of gravity illustrated in FIG. 8. The extraction function 353 extracts lungs included in the three-dimensional chest X-ray CT image data, and extracts lung edges 710 on the basis of the extracted lungs.

For example, the determination function 357 first determines reference edges 720 that are in the direction indicated by arrows in the direction of gravity among edges substantially orthogonal to the gravity direction in the lung edges 710. Then, the determination function 357 sets a threshold line 760 at a position of a threshold distance "$l_{th}$" in the direction of gravity from the reference edge 720. FIG. 8 illustrates an example in which the threshold distance "$l_{th}$ is set to 4 pixels; however, the threshold distance "$l_{th}$" can be set arbitrarily. For example, the threshold distance "$l_{th}$" may be changed according to the body shape of the subject or a biological organ to be analyzed. Alternatively, a user may manually change the threshold distance "$l_{th}$" for operating the input interface 32.

When the threshold line 760 is set as illustrated in FIG. 8, the determination function 357 determines whether shadows that suggest the gravitational effect exist in pixels within the lungs between the reference edge 720 and the threshold line 760. For example, the determination function 357 determines pixels, whose CT values are in a higher CT value range than a predetermined range among the pixels within the lungs between the reference edge 720 and the threshold line 760, as pixels corresponding to the shadows that suggest the gravitational effect.

The CT value range used for the determination can be set arbitrarily. For example, the determination function 357 determines pixels, whose CT values are in the higher CT value range (for example, −800 HU to −600 HU) than a predetermined value (CT value in the normal lung (about −1000 HU)), as pixels corresponding to the shadows that suggest the gravitational effect. For example, the determination function 357 can also use, as a reference value, an average value of the CT values of pixels inside the lung other than between the reference edge 720 and the threshold line 760 in the cross-sectional image data 700, and determine pixels in a higher CT value range than the reference value as pixels corresponding to the shadows that suggest the gravitational effect.

The determination function 357 can also change a CT value range to be used, depending on the situation. For example, the determination function 357 changes a CT value range to be used for determination, depending on the body shape of the subject and the respiratory phase (inspiration or expiration) in which the three-dimensional chest X-ray CT image data was imaged.

As described above, the determination function 357 determines whether the shadows that suggest the gravitational effect exist in the pixels within the lungs between the reference edge 720 and the threshold line 760, thereby specifying regions 770 illustrated in FIG. 8 as regions corresponding to the shadows that suggest the gravitational effect. The determination process by the determination function 357 is not limited to the above-described process, and various other processes can be applied. For example, the determination function 357 can also set a location where the artifact is likely to occur due to the gravitational effect on the basis of clinical knowledge and determine a region that is highly likely to have the artifact, on the basis of the continuity of a high absorption region at that location.

First Weight Setting Process

As described at step S205 in FIG. 7, the first setting function 355a sets the first weight to pixels included in the region 770, which is determined by the determination function 357 as the region corresponding to the shadow that suggests the gravitational effect. For example, the first setting function 355a uniformly sets "0.7" to the pixels included in the region 770 as the first weight. The setting of the first weight described above is merely an example, and the first weight can be set by various other methods. For example, the first setting function 355a can also set "0" to the pixels in the region 770 as the first weight in order to avoid considering regions that suggest the gravitational effect. The first setting function 355a can also set the first weight to each pixel in the region 770 by the method described in the first embodiment.

First Variation

In the embodiment described above, a case where the shadows that suggest the gravitational effect are determined at step S204 on the basis of the CT values of pixels at a certain distance from the reference edge has been described. However, the embodiment is not limited thereto, and the determination may be made using a classifier that receives medical image data as an input and determines whether the gravitational effect is suggested. In such a case, the determination function 357 determines whether the gravitational effect may occur in at least one pixel of the medical image data on the basis of the classifier.

The classifier used for the determination may be one that determines whether each pixel suggests the gravitational effect, or may be one that extracts a region where the gravitational effect is thought to be occurring. For example, it is only required to use a classifier learned to use, as a teacher image, medical image data with manually labeled regions (or pixels) where the gravitational effect is occurring and to determine the regions (pixels) where the gravitational effect is occurring when the medical image data is received.

As described above, according to the second embodiment, the determination function 357 determines whether the gravitational effect may occur in at least one pixel of the medical image data. The first setting function 355a sets the first weight to pixels based on the determination result. Consequently, the medical image processing apparatus 3a according to the second embodiment sets the first weight only to a region where the gravitational effect is highly likely to occur, making it possible to appropriately analyze the medical image data.

According to the second embodiment, the determination function 357 determines whether the gravitational effect may occur in at least one pixel of the medical image data, on the basis of the result of image analysis on the medical image data. Consequently, the medical image processing apparatus 3a according to the second embodiment enables easy determination processing.

According to the second embodiment, the determination function 357 determines whether the gravitational effect may occur in at least one pixel of the medical image data, on the basis of a classifier. Consequently, the medical image processing apparatus 3a according to the second embodiment enables easy determination processing.

Third Embodiment

In the first embodiment and the second embodiment described above, cases of performing analysis using the first weight based on the direction of gravity has been described. The third embodiment describes a case where a second weight is set to a portion of medical image data considered to be important for analysis for reasons other than the gravitational effect and analysis is performed using the first weight and the second weight. In the following, as in the first embodiment, it is assumed that the three-dimensional chest X-ray CT image data is used as image data to be analyzed and lungs are extracted as a structure. It is assumed that the analysis target is subjected to estimation of lung diseases, particularly, analysis related to interstitial lung abnormalities.

Figure 9:
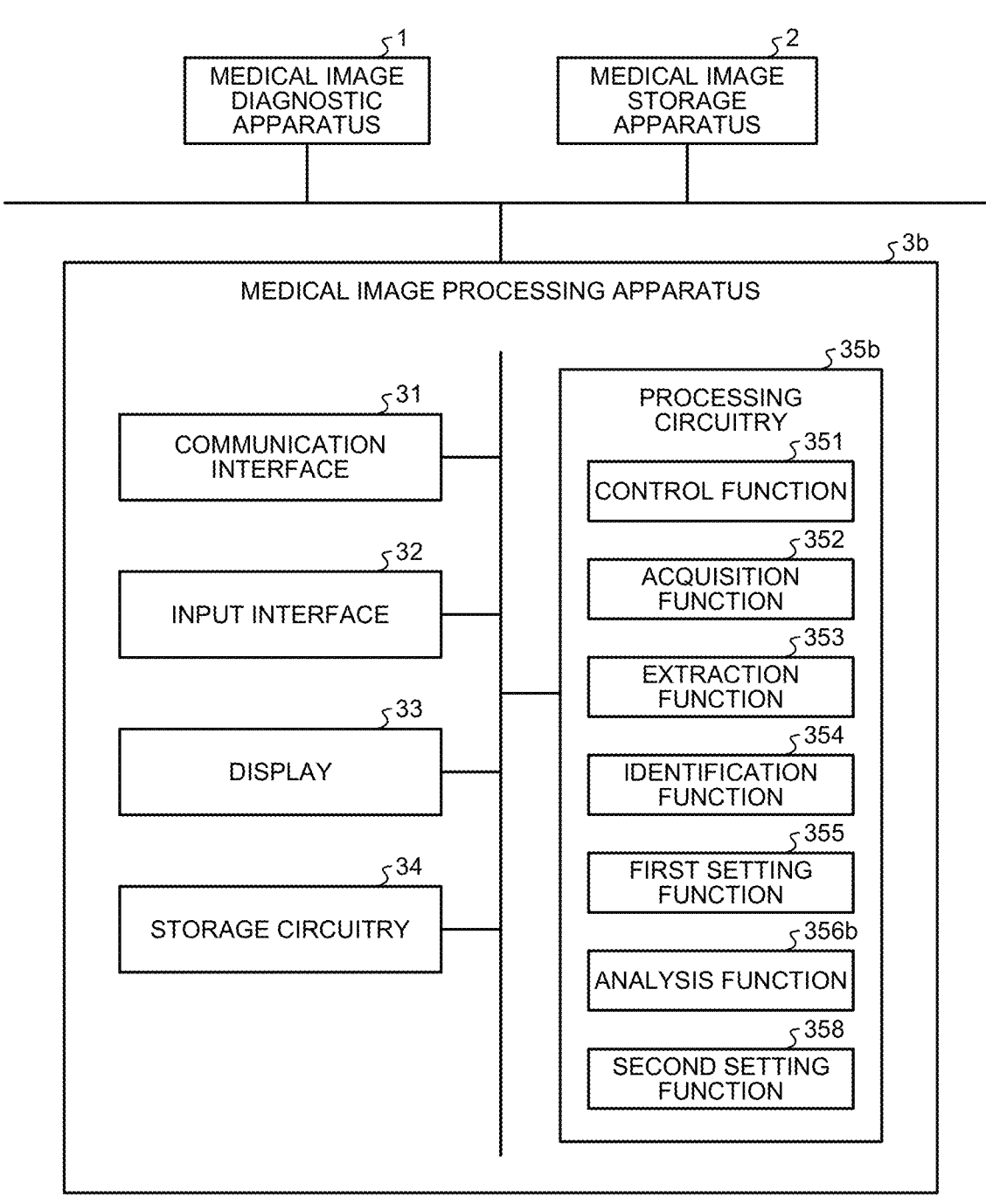
FIG. 9 is a diagram illustrating a configuration example of a medical image processing apparatus according to a third embodiment.

FIG. 9 is a diagram illustrating a configuration example of a medical image processing apparatus according to the third embodiment. In FIG. 9, the same reference numerals are assigned to components that operate in the same manner as the medical image processing apparatus 3 according to the first embodiment illustrated in FIG. 1. That is, a medical image processing apparatus 3b according to the third embodiment is different from the medical image processing apparatus 3 according to the first embodiment in that processing circuitry 35b newly performs a second setting function 358 and that the processing content of an analysis function 356b performed by the processing circuitry 35b is different from that in the first embodiment. These are mainly described below.

Figure 10:
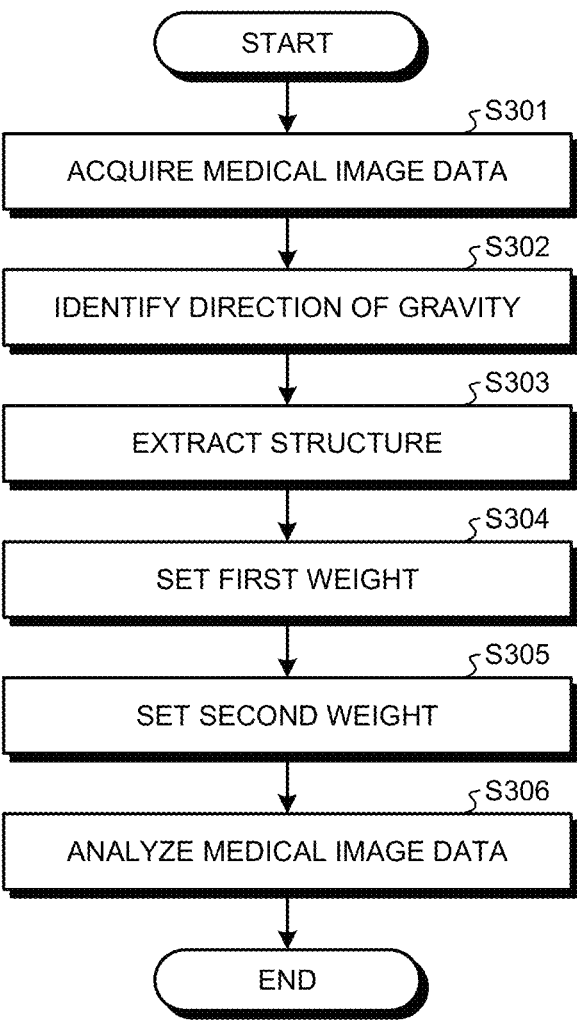
FIG. 10 is a flowchart illustrating the procedure of processing performed by each processing function of processing circuitry of the medical image processing apparatus according to the third embodiment.

FIG. 10 is a flowchart illustrating the procedure of processing performed by each processing function of the processing circuitry 35b of the medical image processing apparatus 3b according to the third embodiment.

Steps S301 to S304 in FIG. 10 are implemented by the processing circuitry 35b that reads a computer program corresponding to each processing function from the storage circuitry 34 and executes the read computer program, as in steps S101 to S104 in FIG. 2.

For example, as illustrated in FIG. 10, in the present embodiment, when the first setting function 355 sets the first weight (step S304), the second setting function 358 sets the second weight to the pixels of the medical image data on the basis of the structure of the subject extracted from the medical image data (step S305). This process is implemented by, for example, the processing circuitry 35b that calls a computer program corresponding to the second setting function 358 from the storage circuitry 34 and executes the read computer program.

Subsequently, the analysis function 356b analyzes the medical image data on the basis of the first weight and the second weight set to the medical image data (step S306). This process is implemented by, for example, the processing circuitry 35b that calls a computer program corresponding to the analysis function 356b from the storage circuitry 34 and executes the read computer program.

Details of each process performed by the medical image processing apparatus 3b are described below.

Second Weight Setting Process

As described at step S305 in FIG. 10, the second setting function 358 sets the second weight to the pixels of the three-dimensional chest X-ray CT image data on the basis of the lungs extracted from the three-dimensional chest X-ray CT image data. The second weight is set according to the purpose of analysis. For example, when the analysis target is interstitial lung disease as in the present embodiment, the second setting function 358 sets the second weight according to the distance from the chest wall on the basis of prior knowledge that information near the chest wall is important.

Figure 11A:
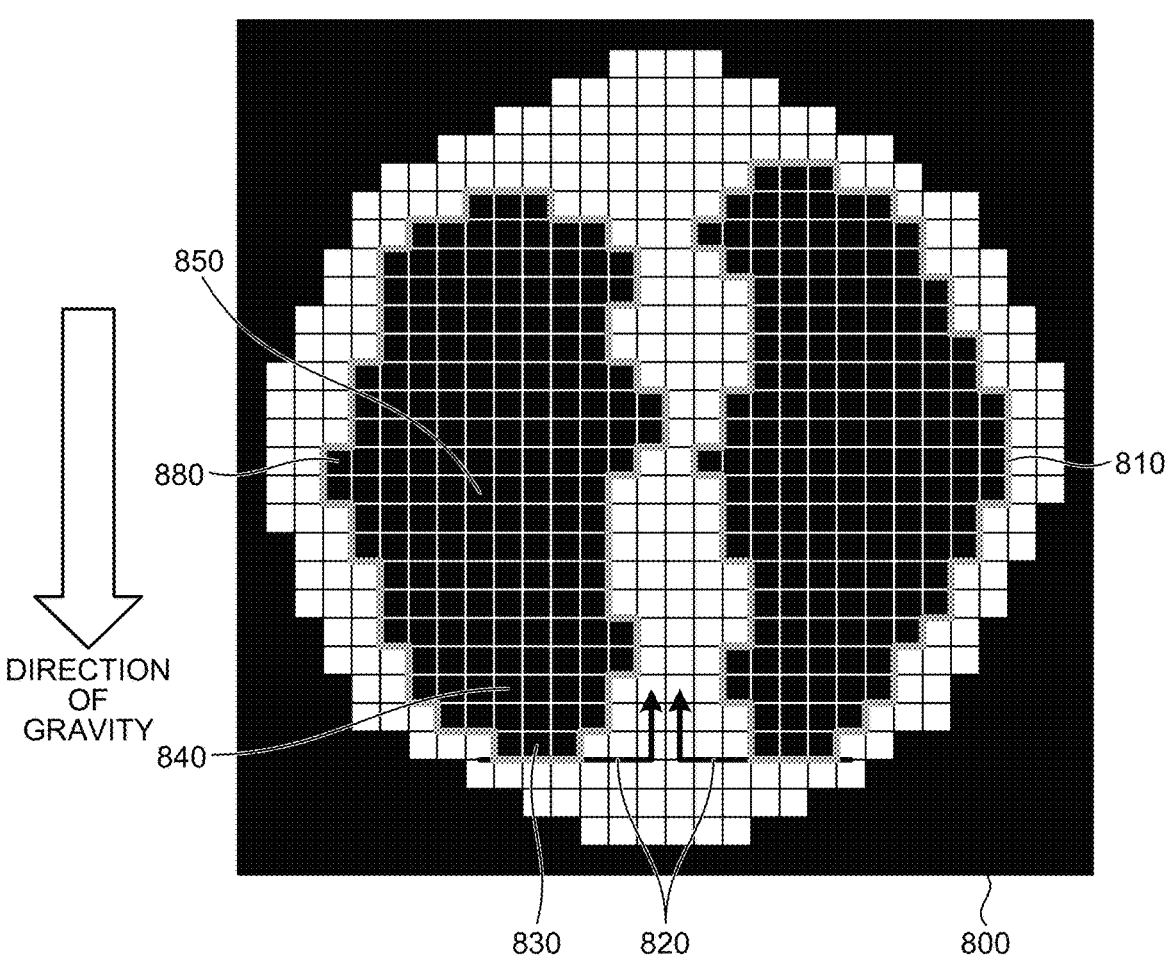
FIG. 11A is a diagram for explaining an example of a second weight setting process according to the third embodiment.
Figure 11B:
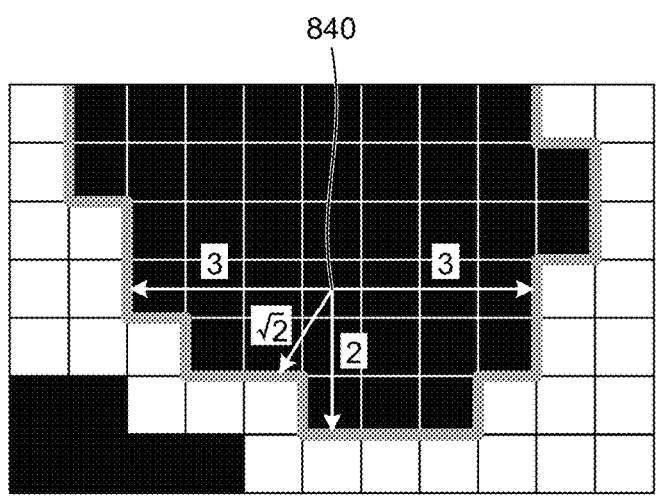
FIG. 11B is a diagram for explaining an example of the second weight setting process according to the third embodiment.

FIGS. 11A and 11B are diagrams for explaining an example of the second weight setting process according to the third embodiment. FIG. 11A illustrates one cross-sectional image data 800 of an axial cross-section in the three-dimensional chest X-ray CT image data. FIG. 11B illustrates an enlarged view of a part of FIG. 11A. The identification function 354 identifies the direction of gravity illustrated in FIG. 11A. The extraction function 353 extracts the lungs included in the three-dimensional chest X-ray CT image data, and extracts lung edges 810 on the basis of the extracted lungs. The first setting function 355 determines reference edges 820 on the basis of the direction of gravity and the lung edges 810.

For example, the second setting function 358 assumes that the chest wall exists outside the extracted lung and sets the second weight to pixels on the basis of the distance from the edge of the extracted lung. In an example, the second setting function 358 sets the second weight to each pixel on the basis of equation (3) below.

$$w_2(i)=2-0.25\times\min(l_2(i),4) \tag{3}$$

In equation (3) above, "$w_2(i)$" indicates the second weight of a pixel i. "$l_2(i)$" indicates the shortest distance (in terms of number of pixels) from the edge of the lung to a corresponding pixel. "$\min(l_2(i), 4)$" indicates a function that takes a smaller value between "$l_2(i)$" and "4".

For example, the second setting function 358 sets the second weight "$w_2=2-0.25\times0=2$" by inputting "$l_2=0$" into equation (3) above for a pixel 830 and a pixel 880 in contact with a lung edge 810 in FIG. 11A. For a pixel 840, the second setting function 358 first calculates the shortest distance "$l_2=\sqrt{2}$" to the lung edge 810, as illustrated in FIG. 11B. Then, the second setting function 358 sets the second weight "$w_2=2-0.25\times\sqrt{2}=1.7$" by inputting "$l_2=\sqrt{2}$" into equation (3) above. The second setting function 358 sets the second weight "$w_2=2-0.25\times4=1$" to a pixel 850 whose shortest distance to the lung edge 810 is greater than "4".

That is, equation (3) above indicates that when the distance to the lung edge is less than a threshold value (4 in this example), the second weight increases as the distance from the lung edge decreases. The equation takes into account the above-mentioned prior knowledge. Of course, the setting method using the equation is merely an example, and the second weight may be set by other methods. For example, the distance to a lung edge in the mediastinal direction may be ignored (assumed to be infinite) using priori knowledge that an edge in the mediastinal direction (for example, direction closer to a heart or a liver) is less important.

Analysis Process

As described at step S306 in FIG. 10, the analysis function 356b performs an analysis process on the three-dimensional chest X-ray CT image data by using the first weight set to each pixel by the first setting function 355 and the second weight set by the second setting function 358. For example, the analysis function 356b performs the same analysis as in the first embodiment on the basis of a weight obtained by synthesizing the first weight and the second weight by linear summation. The analysis function 356b synthesizes weights by, for example, equation (4) below.

$$w(i)=\alpha w_1(i)+(1-\alpha)w_2(i) \tag{4}$$

In equation (4) above, "$w(i)$" indicates a synthesized weight and "$\alpha$" indicates a coefficient. For example, when "$\alpha$" is increased, the first weight "$w_1(i)$" is emphasized, and when "$\alpha$" is decreased, the second weight "$w_2(i)$" is emphasized. In the present embodiment, it is assumed that "$\alpha=0.5$". That is, the first weight and the second weight are regarded to be the same.

For example, when taking the pixels in FIG. 11A as an example, the analysis function 356b calculates a weight "w=1.3" by substituting the first weight "$w_1=0.5$" and the second weight "$w_2=2.0$" into equation (4) above with respect to the pixel 830. Similarly, the analysis function 356b calculates a weight "w=1.2" by substituting the first weight "$w_1=0.7$" and the second weight "$w_2=1.7$" into equation (4) above with respect to the pixel 840.

The analysis function 356b calculates a weight "w=1.0" by substituting the first weight "$w_1=1.0$" and the second weight "$w_2=1.0$" into equation (4) above with respect to the pixel 850. The analysis function 356b calculates a weight "w=1.5" by substituting the first weight "$w_1=1.0$" and the second weight "$w_2=2.0$" into equation (4) above with respect to the pixel 880.

When the calculated weights are compared, between the pixel 830 ("w=1.3") and the pixel 880 ("w=1.5") closest to the chest wall, which are considered to be important based on the prior knowledge, the pixel 830, where the gravitational effect is highly likely to occur, has a smaller weight. That is, according to Equation (4) above, weights are set even to pixels closest to the same chest wall, in consideration of the influence of the gravitational effect.

The synthesis of the first weight and the second weight is not limited to the method according to Equation (4) above, and may be performed by other methods. For example, weights may be synthesized by linear product, nonlinear sum, or nonlinear product. Alternatively, appropriate coefficients may be configured to learn through machine learning.

When the weights are calculated as described above, the analysis function 356b performs the analysis process of the medical image data based on the image processing described in the first embodiment.

First Variation

In the embodiment described above, a case where the second weight is set at step S305 on the basis of prior knowledge according to the analysis target has been described. However, the embodiment is not limited thereto, and the second weight may be set on the basis of motion artifacts. In such a case, for example, the extraction function 353 extracts a heart, a diaphragm, and the like as structures.

The second setting function 358 sets the second weight according to the distance from the extracted heart and diaphragm. That is, on the basis of prior knowledge that motion artifacts are caused by the beating of the heart or the rise and fall of the diaphragm, the second setting function 358 sets the second weight so that pixels closer to the heart or the diaphragm have a smaller second weight. In other words, the second setting function 358 sets a smaller second weight to pixels that are highly likely to have motion artifacts.

Second Variation

In the embodiment described above, a case where analysis using image processing is performed at step S306 has been described. However, the embodiment is not limited thereto, and analysis by a learner may be performed as in the first embodiment. That is, the analysis function 356b generates weighted image data based on the first weight and the second weight, and analyzes the medical image data on the basis of the weighted image data. For example, the analysis function 356b generates synthetic weighted image data from synthesized weights, and acquire an analysis result by inputting the medical image data (three-dimensional chest X-ray CT image data) and the synthetic weighted image data to the learner.

The weighted image data based on the first weight and the second weight is not limited to the synthetic weighted image data described above, and for example, first weighted image data and second weighted image data may be generated for the first weight and the second weight, respectively, and deep learning may be performed using the medical image data, the first weighted image data, and the second weighted image data as inputs. This has the advantage that coefficients for the synthetic weights do not need to be determined.

As described above, according to the third embodiment, the second setting function 358 sets the second weight to the pixels of the medical image data on the basis of the structure extracted from the medical image data. The analysis function 356b analyzes the medical image data on the basis of the first weight and the second weight. Consequently, the medical image processing apparatus 3b according to the third embodiment can perform analysis in consideration of both the gravitational effect and the prior knowledge, making it possible to more appropriately analyze the medical image data.

According to the third embodiment, the second setting function 358 sets the second weight to pixels on the basis of the distance from the edge of the structure. Consequently, the medical image processing apparatus 3b according to the third embodiment allows the second weight to be set according to the purpose of analysis.

According to the third embodiment, the analysis function 356b generates weighted image data based on the first weight and the second weight and analyzes the medical image data on the basis of the weighted image data. Consequently, the medical image processing apparatus 3b according to the third embodiment enables easy analysis using the first weight and the second weight.

Other Embodiments

In the embodiments described above, a case where the three-dimensional chest X-ray CT image data is used as medical image data to be analyzed has been described. However, the embodiments are not limited thereto, and medical image data imaged by other modalities or medical image data targeting other sites may also be used for analysis.

In the embodiments described above, a case where the three-dimensional chest X-ray CT image data is used as medical image data to be analyzed has been described. However, the embodiments are not limited thereto, and for example, sinograms may be used as the medical image data to be analyzed.

In the embodiments described above, a case where CT image data imaged by an X-ray CT apparatus that images an image of a lying subject is targeted has been described. However, the embodiments are not limited thereto, and for example, CT image data imaged by an X-ray CT apparatus that images an image of a subject in a standing position may be targeted. In such a case, the direction affected by gravity is the downward direction in the Z-axis direction in a sagittal section (sagittal plane) or a coronal section (coronal plane).

In the embodiments described above, a case of displaying an analysis result has been described, but the analysis result can be displayed in various forms. For example, the analysis function 356 performs analysis that considers the gravitational effect and analysis that does not consider the gravitational effect. The control function 351 may display each analysis result. When an analysis result of the analysis that considers the gravitational effect and the analysis result of an analysis that does not consider the gravitational effect are different from each other, the control function 351 may control the difference to be notified.

In the embodiments described above, an example in which the acquisition unit, the extraction unit, the identification unit, the first setting unit, the analysis unit, the determination unit, and the second setting unit in this specification are respectively implemented by the acquisition function, the extraction function, the identification function, the first setting function, the analysis function, the determination function, and the second setting function of the processing circuitry have been described; however, the embodiments are not limited thereto. For example, the acquisition unit, the extraction unit, the identification unit, the first setting unit, the analysis unit, the determination unit, and the second setting unit in this specification may be implemented by the acquisition function, the extraction function, the identification function, the first setting function, the analysis function, the determination function, and the second setting function described in the embodiments, or the same processing functions may also be implemented by hardware only, software only, or a combination of hardware and software.

The term "processor" used in the description of the embodiments described above means, for example, circuitry such as a central processing unit (CPU), a graphics processing unit (GPU), an application specific integrated circuit (ASIC), or a programmable logic device (for example, a simple programmable logic device (SPLD), a complex programmable logic device (CPLD), and a field programmable gate array (FPGA)). Instead of storing the computer programs in a storage circuitry, the computer programs may be directly incorporated in the circuitry of the processor. In this case, the processor implements the functions by reading and executing the computer programs incorporated in the circuitry. Furthermore, each processor of the present embodiment is not limited to being configured as single piece of circuitry for each processor, and one processor may be configured by combining a plurality of pieces of independent circuitry to implement the functions thereof.

The medical image processing program executed by the processor is provided by being incorporated in advance in a read only memory (ROM), the storage circuitry, or the like. The medical image processing program may be provided by being recorded on a computer readable non-transitory storage medium, such as a CD (compact disc)-ROM, a flexible disk (FD), a CD-R (compact disc recordable), and a digital versatile disc (DVD), in a file format installable or executable in these devices. Furthermore, the medical image processing program may be provided or distributed by being stored on a computer connected to a network such as the Internet and downloaded via the network. For example, the medical image processing program is configured as a module including the aforementioned each processing function. As actual hardware, the CPU reads and executes the medical image processing program from the storage medium such as a ROM, so that each module is loaded on a main storage device and generated on the main storage device.

In the embodiments and the variations described above, each component of each device illustrated in the drawings is a functional concept, and does not necessarily have to be physically configured as illustrated in the drawings. That is, the specific form of dispersion or integration of each device is not limited to those illustrated in the drawings, but can be configured by functionally or physically dispersing or integrating all or part thereof in arbitrary units, depending on various loads and usage conditions. Moreover, each processing function performed by each device can be implemented in whole or in part by a CPU and a computer program that is analyzed and executed by the CPU, or by hardware using wired logic.

Of the processes described in the embodiments and the variations described above, all or part of the processes described as being performed automatically can be performed manually, or all or part of the processes described as being performed manually can be performed automatically by known methods. Processing procedures, control procedures, specific names, and information including various data and parameters described in the above description and drawings may be changed as desired, unless otherwise noted.

According to at least one of the embodiments described above, appropriate analysis can be performed even when analysis is performed on medical image data that is highly likely to be forged due to the gravitational effect.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising: processing circuitry configured to
   acquire medical image data to be analyzed,
   estimate a posture of a subject from (a) imaging information of the medical image data, or (b) image analysis of the medical image data,
   identify a direction of gravity for the medical image data based on the estimated posture,
   set a first weight to pixels constituting the medical image data based on the identified direction of gravity, and
   analyze the medical image data based on the set first weight.

2. The medical image processing apparatus according to claim 1, wherein the processing circuitry is further configured to extract at least one structure of a subject from the medical image data, and set the first weight based on the identified direction of gravity and the at least one structure.

3. The medical image processing apparatus according to claim 1, wherein the processing circuitry is further configured to determine whether a gravitational effect occurs in at least one pixel of the medical image data, and set the first weight to the pixel based on a result of the determination.

4. The medical image processing apparatus according to claim 3, wherein the processing circuitry is further configured to determine whether the gravitational effect occurs in at least one pixel of the medical image data, based on a result of image analysis on the medical image data.

5. The medical image processing apparatus according to claim 3, wherein the processing circuitry is further configured to determine whether the gravitational effect occurs in at least one pixel of the medical image data, based on a classifier.

6. The medical image processing apparatus according to claim 1, wherein the processing circuitry is further configured to set the first weight to the pixel based on the identified direction of gravity and a distance from an edge of a structure extracted from the medical image data.

7. The medical image processing apparatus according to claim 1, wherein, based on the identified direction of gravity and a structure extracted from the medical image data, the processing circuitry is further configured to calculate an angle at which a portion corresponding to the pixel is supported by the structure and set the first weight to the pixel based on the calculated angle and a distance to the structure.

8. The medical image processing apparatus according to claim 1, wherein the processing circuitry is further configured to set a second weight to a pixel of the medical image data based on a structure extracted from the medical image data, and analyze the medical image data based on the first weight and the second weight.

9. The medical image processing apparatus according to claim 8, wherein the processing circuitry is further configured to set the second weight to the pixel based on a distance from an edge of the structure.

10. The medical image processing apparatus according to claim 1, wherein the processing circuitry is further configured to generate weighted image data based on the first weight, and analyze the medical image data based on the weighted image data.

11. The medical image processing apparatus according to claim 8, wherein the processing circuitry is further configured to generate weighted image data based on the first weight and the second weight, and analyze the medical image data based on the weighted image data.

12. A medical image processing method, comprising:
   acquiring medical image data to be analyzed;
   estimating a posture of a subject from (a) imaging information of the medical image data, or (b) image analysis on the medical image data;
   identifying a direction of gravity for the medical image data based on the estimated posture;
   setting a first weight to pixels constituting the medical image data based on the identified direction of gravity; and
   analyzing the medical image data based on the set first weight.

13. A storage medium storing therein, in a non-transitory manner, a program that causes a computer to execute processes of:
   acquiring medical image data to be analyzed;
   estimating a posture of a subject from (a) imaging information of the medical image data, or (b) image analysis on the medical image data;
   identifying a direction of gravity for the medical image data based on the estimated posture;
   setting a first weight to pixels constituting the medical image data based on the identified direction of gravity; and
   analyzing the medical image data based on the set first weight.

14. A medical image processing apparatus, comprising: processing circuitry configured to
   acquire medical image data to be analyzed,
   identify a direction of gravity for the medical image data,
   set a first weight value to each pixel constituting the medical image data based on the identified direction of gravity, and
   analyze the medical image data by (a) multiplying the first weight value set based on the identified direction of gravity and each pixel value of the medical image data, or (b) inputting, to a machine learning model, the medical image data and image data in which each pixel value corresponds to the first weight value set based on the identified direction of gravity and set for each pixel of the medical image data.

15. The medical image processing apparatus according to claim 14, wherein the medical image data is X-ray CT image data.

16. The medical image processing apparatus according to claim 14, wherein the processing circuitry is further configured to infer a disease name by analyzing the medical image data.

17. The medical image processing apparatus according to claim 14, wherein the processing circuitry is configured to analyze the medical image data for interstitial lung abnormalities.

18. A medical image processing apparatus, comprising:
processing circuitry configured to
    acquire medical image data of a subject to be analyzed,
    identify a direction of gravity for the medical image data,
    set a first weight to pixels constituting the medical image data based on the identified direction of gravity and a distance from an edge of a body tissue, of the subject, extracted from the medical image data, and
    analyze the medical image data based on the set first weight.

19. The medical image processing apparatus of claim 1, wherein the processing circuitry is further configured to display, on a display, an analysis result of the analyzing of the medical image data.

20. The medical image processing apparatus of claim 18, wherein the processing circuitry is further configured to determine the edge of the body tissue, which is in the identified direction of gravity in the medical image data.

* * * * *